United States Patent
Lin et al.

(10) Patent No.: US 8,203,840 B2
(45) Date of Patent: Jun. 19, 2012

(54) SELF-CLEANING COMPUTER

(75) Inventors: Yi-Ying Lin, Taipei Hsien (TW); Hao-Der Cheng, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 50 days.

(21) Appl. No.: 12/909,805

(22) Filed: Oct. 21, 2010

(65) Prior Publication Data
US 2011/0304982 A1    Dec. 15, 2011

(30) Foreign Application Priority Data
Jun. 9, 2010   (TW) ............................... 99118649 A

(51) Int. Cl.
*H05K 7/20* (2006.01)
(52) U.S. Cl. ........................................ 361/695; 361/694
(58) Field of Classification Search .................. None
See application file for complete search history.

(56) References Cited

U.S. PATENT DOCUMENTS

| | | | |
|---|---|---|---|
| 6,840,974 B2 * | 1/2005 | Bailey | 55/385.6 |
| 7,643,295 B2 * | 1/2010 | Chao et al. | 361/700 |
| 7,852,628 B2 * | 12/2010 | Hirohata et al. | 361/695 |
| 8,055,392 B2 * | 11/2011 | Kitamura et al. | 700/300 |
| 2007/0058346 A1 * | 3/2007 | Yeh | 361/697 |
| 2009/0272404 A1 * | 11/2009 | Kim | 134/16 |

* cited by examiner

*Primary Examiner* — Gregory Thompson
(74) *Attorney, Agent, or Firm* — Altis Law Group, Inc.

(57) ABSTRACT

An exemplary self-cleaning computer includes an enclosure defining an air inlet therein, a control processing unit (CPU) received in the enclosure, a vibration element mounted on the enclosure, and a control device electrically connected between the CPU and the vibration element. The control device is configured to direct the vibration element to vibrate when the computer is in a particular predefined state, and thereby the enclosure is agitated and clogged dust dislodges therefrom.

18 Claims, 2 Drawing Sheets

SELF-CLEANING COMPUTER

BACKGROUND

1. Technical Field

The present disclosure relates to computers, and particularly to a self-cleaning computer with a vibration element.

2. Description of Related Art

Generally, a computer includes an enclosure and a plurality of electronic components received in the enclosure. The electronic components generate heat during operation, and the heat is required to be immediately dissipated from the enclosure to the exterior. Commonly, the enclosure defines an air inlet and an air outlet at two sides for achieving such heat dissipation. A cooling fan is provided at the air outlet to drive hot air from inside the enclosure to the exterior. Simultaneously, cool air from the exterior is drawn into the enclosure via the air inlet, thereby cooling the electronic components in the enclosure. However, dust often accumulates at the air inlet, obstructing inbound airflow, such that the heat dissipation of the electronic components is impaired.

Thus, it is desired to overcome the described limitations.

DETAILED DESCRIPTION

Figure 1:
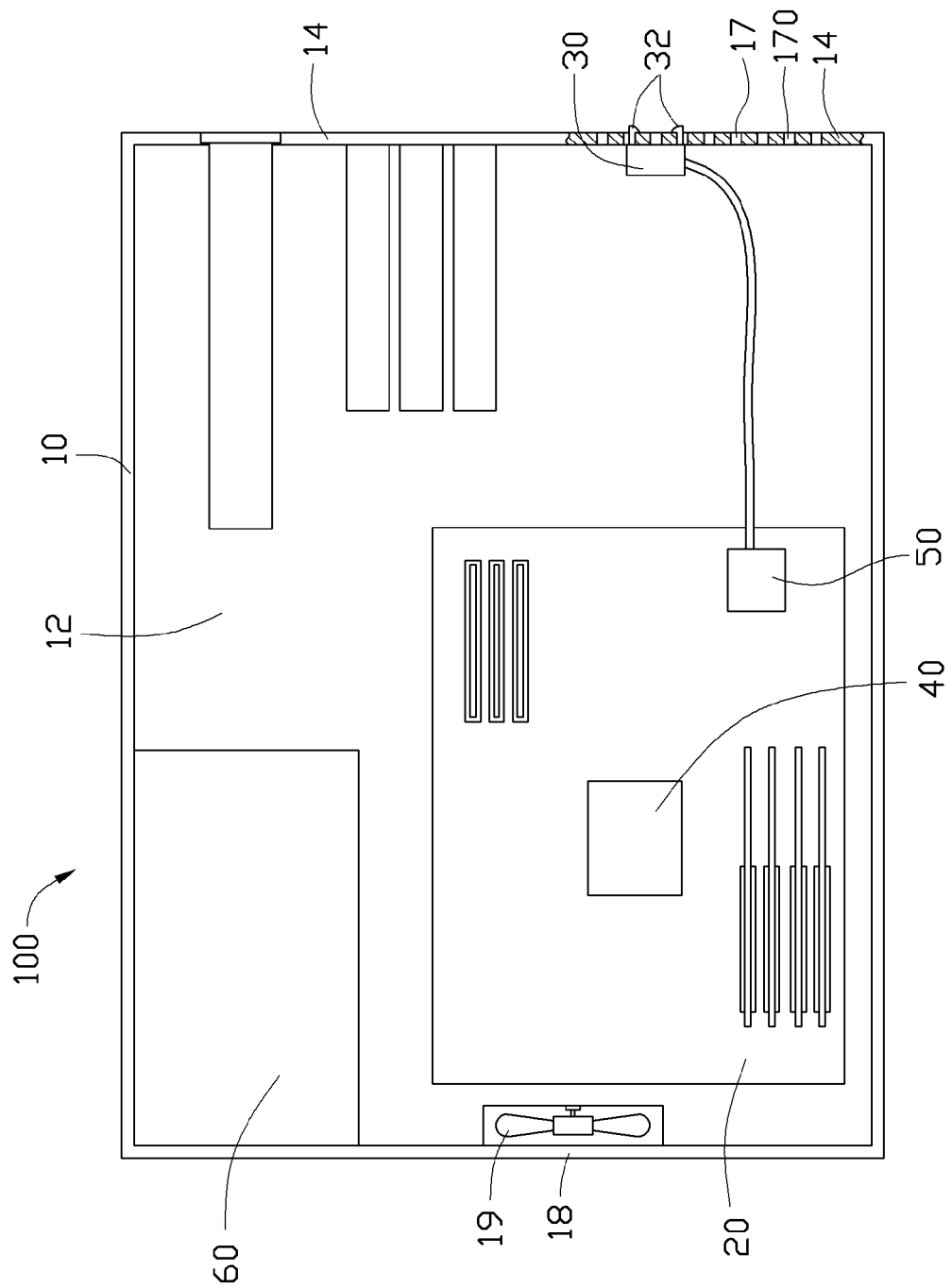
FIG. 1 is a top view of a computer in accordance with an exemplary embodiment, with a cover of an enclosure of the computer omitted.
Figure 2:
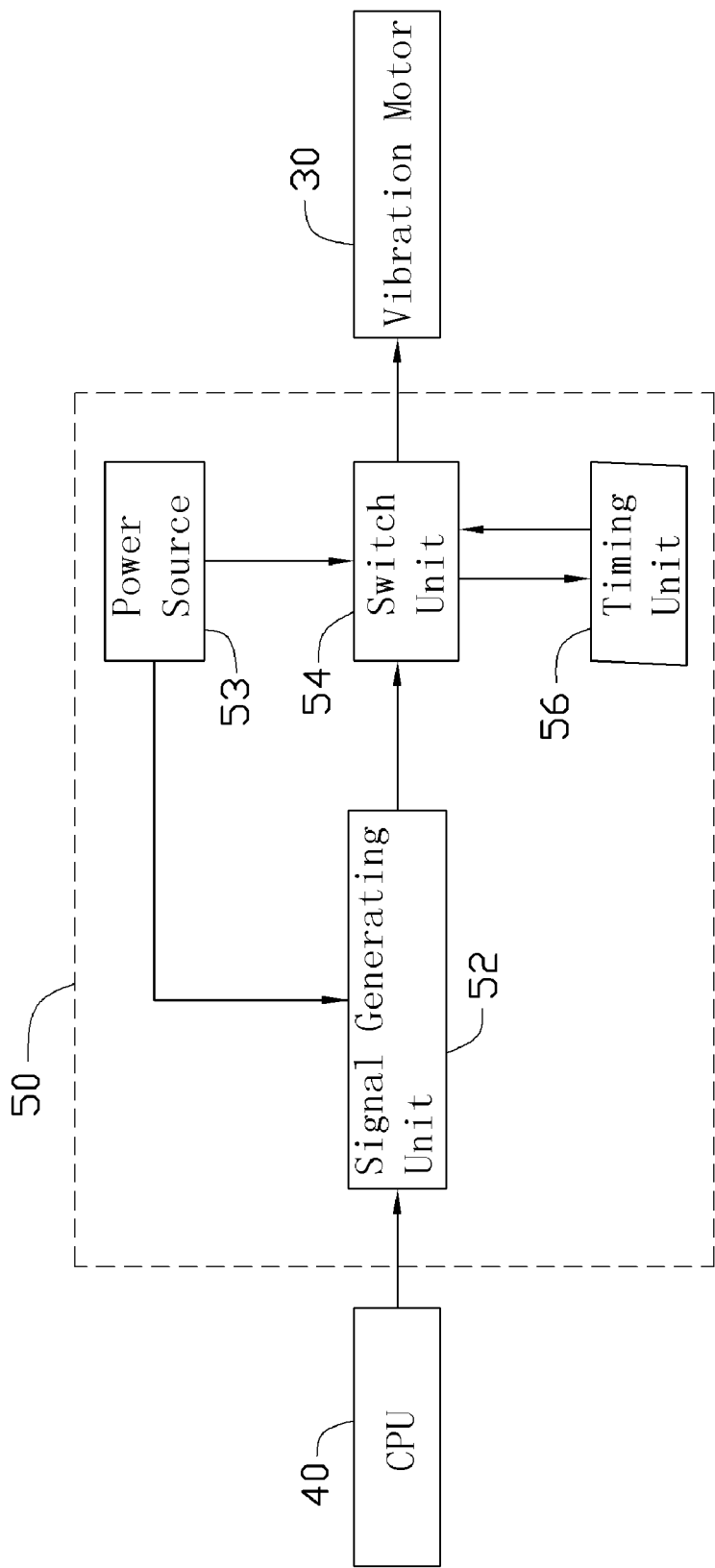
FIG. 2 is a block diagram of certain parts of the computer of FIG. 1.

Referring to FIG. 1, a computer 100 according to an exemplary embodiment is shown. The computer 100 includes an enclosure 10, a circuit board 20 received in the enclosure 10, a power supply 60, and a vibration element 30 mounted on the enclosure 10. In this embodiment, the vibration element 30 is a vibration motor 30.

The enclosure 10 includes a rectangular bottom panel 12, and a sidewall 14 extending upwardly from a circumference of the bottom panel 12. The enclosure 10 further includes a top cover (not shown) covering the top edges of the sidewall 14. The bottom panel 12, the sidewall 14 and the top cover cooperatively define a receiving space (not shown) in the enclosure 10. The sidewall 14 defines an air inlet 17 at one side and an air outlet 18 at an opposite side thereof. The receiving space communicates with the exterior via each of the air inlet 17 and the air outlet 18. A cooling fan 19 is mounted on the sidewall 14 and aligned with the air outlet 18 to drive air from the receiving space to the exterior via the air outlet 18.

The air inlet 17 includes a plurality of small holes 170 extending through the sidewall 14. The vibration motor 30 is located at an inner side of the sidewall 14 corresponding to the air inlet 17. The vibration motor 30 forms a pair of hooks 32 at one side thereof. Each hook 32 is L-shaped, and extends outwardly from an outer surface of the vibration motor 30. The hooks 32 of the vibration motor 30 extend through two of the holes 170 of the air inlet 17, respectively, with the distal end of each hook 32 abutting an outer surface of the enclosure 10 adjacent to an outer periphery of a corresponding hole 170. Thereby, the vibration motor 30 is fixed on the sidewall 14 of the enclosure 10. The hooks 32 of the vibration motor 30 are made of material with high strength and elasticity, such as metal.

The circuit board 20 is mounted on a top surface of the bottom panel 12. The circuit board 20 is electrically connected with the power supply 60 to receive power from the power supply 60. A central processing unit (CPU) 40 of the computer 100 and a control device 50 of the vibration motor 30 are mounted on the circuit board 20. The control device 50 is electrically connected between the CPU 40 and the vibration motor 30 to control the operation of the vibration motor 30.

The control device 50 includes a signal generating unit 52, a power source 53, a switch unit 54, and a timing unit 56. The power source 53 is electrically connected with the circuit board 20 to receive power from the circuit board 20. Alternatively, the power source 53 can be electrically connected with the power supply 60 of the computer 100 directly, to receive power from the power supply 60. The switch unit 54 is electrically connected between the power source 53 and the vibration motor 30, to turn the vibration motor 30 on or off. When the switch unit 54 is turned on, the vibration motor 30 receives power from the power source 53, and accordingly the vibration motor 30 begins operation. When the switch unit 54 is turned off, the supply of power to the vibration motor 30 is cut off, and the operation of the vibration motor 30 ceases. The power source 53 is electrically connected to the signal generating unit 52 to provide power to the signal generating unit 52.

The signal generating unit 52, electrically connected between the CPU 40 and the switch unit 54, is set to detect a state of the computer 100 from the CPU 40. The signal generating unit 52 generates a drive signal and sends it to the switch unit 54 to turn on the switch unit 54 when the computer 100 is in a particular state. Examples of particular states are given below.

The timing unit 56 is electrically connected with the switch unit 54. When the switch unit 54 is turned on, the timing unit 56 starts to measure the operating duration of the vibration motor 30, outputting a clock signal to the switch unit 54 after a predetermined time to cause the switch unit 54 to turn off the vibration motor 30.

During operation, the signal generating unit 52 generates a drive signal and sends the drive signal to the switch unit 54 to turn on the vibration motor 30 during the particular state of the computer 100, and the vibration motor 30 vibrates immediately after the switch unit 54 is turned on. The enclosure 10, agitated in turn by the vibration motor 30, dislodges clogged dust from the air inlet 17. Simultaneously, the timing unit 56 begins measurement of the operating duration of the vibration motor 30 immediately after the switch unit 54 is turned on. The timing unit 56 then outputs a clock signal to the switch unit 54 after a predetermined time to cause the switch unit 54 to turn off, such that the vibration motor 30 stops working immediately after the switch unit 54 is turned off. In practice, the signal generating unit 52 may generate the drive signal when the computer 100 is powering off. Alternatively, the signal generating unit 52 may generate the drive signal at the moment immediately after the computer 100 has been powered off. The operating duration of the vibration motor 30 can be set according to a practical need of the computer 100, such as five seconds.

The action of the vibration motor 30 allows the computer 100 to remove clogged dust from the air inlet 17 if not also from other parts of the computer 100. In addition, the vibration motor 30 is set to operate when the computer 100 is powered off or immediately thereafter. Each such set operation occurs after the normal working time of the computer 100, such that ordinary use or operation of the computer 100 is undisturbed by any possible adverse effects of the vibration motor 30.

In an alternative embodiment, the control device 50 can instead include a micro-programmed control unit (MCU), which includes a preset program therein for simultaneously functioning as the signal generating unit 52, the switch unit 54 and the timing unit 56 described above.

It is to be understood, however, that even though numerous characteristics and advantages of the exemplary embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A self-cleaning computer, comprising:
an enclosure defining an air inlet therein;
a central processing unit (CPU) received in the enclosure;
a vibration element mounted on the enclosure; and
a control device electrically connected between the CPU and the vibration element;
wherein the control device is configured to direct the vibration element to vibrate when the computer is in a particular predefined state and thereby agitate the enclosure.

2. The computer of claim 1, wherein the vibration element comprises a vibration motor.

3. The computer of claim 1, wherein the control device comprises a power source, a switch unit electrically connected between the power source and the vibration element, and a signal generating unit electrically connected between the CPU and the switch unit, the signal generating unit electrically connected with the power source, the signal generating unit configured for generating a drive signal and sending the drive signal to the switch unit to turn on the switch unit in the particular state such that the vibration element receives power from the power source and vibrates.

4. The computer of claim 3, wherein the control device further comprises a timing unit electrically connected with the switch unit, the timing unit configured for measuring the operating duration of the vibration element immediately after the switch unit is turned on, and outputting a clock signal to the switch unit after a predetermined time to cause the switch unit to turn off and the vibration motor to accordingly stop working.

5. The computer of claim 1, wherein the control device is configured to direct the vibration element to vibrate when the computer is powering off.

6. The computer of claim 1, wherein the control device is configured to direct the vibration element to vibrate immediately after the computer has been powered off.

7. The computer of claim 1, further comprising a cooling fan, wherein the enclosure further defines an air outlet therein, and the cooling fan is attached to the enclosure at the air outlet for driving air from inside the enclosure to an exterior of the enclosure.

8. The computer of claim 1, wherein the air inlet comprises a plurality of small holes, and the vibration element comprises a pair of hooks extending through two corresponding holes of the air inlet, respectively, whereby the vibration element is fixed on the enclosure.

9. The computer of claim 8, wherein each hook of the vibration element is L-shaped.

10. A self-cleaning computer, comprising:
an enclosure defining an air inlet therein;
a circuit board mounted in the enclosure;
a central processing unit (CPU) mounted on the circuit board;
a vibration element mounted on the enclosure; and
a control device electrically connected between the CPU and the vibration element, the control device also electrically connected with the circuit board, and the control device structured and arranged to direct the vibration element to vibrate when the computer is in a particular predefined state and thereby agitate the enclosure.

11. The computer of claim 10, wherein the vibration element comprises a vibration motor.

12. The computer of claim 10, wherein the control device comprises a power source electrically connected with the circuit board, a switch unit electrically connected between the power source and the vibration element, and a signal generating unit electrically connected between the CPU and the switch unit, the signal generating unit electrically connected with the power source, the signal generating unit configured for generating a drive signal and sending the driving signal to the switch unit to turn on the switch unit in the particular state such that the vibration element receives power from the power source and vibrates.

13. The computer of claim 12, wherein the control device further comprises a timing unit electrically connected with the switch unit, the timing unit configured for measuring the operating duration of the vibration element immediately after the switch unit is turned on, and outputting a clock signal to the switch unit after a predetermined time to cause the switch unit to turn off and the vibration motor to accordingly stop working.

14. The computer of claim 10, wherein the control device is configured to direct the vibration element to vibrate when the computer is powering off.

15. The computer of claim 10, wherein the control device is configured to direct the vibration element to vibrate immediately after the computer has been powered off.

16. The computer of claim 10, further comprising a cooling fan, wherein the enclosure further defines an air outlet therein, and the cooling fan is attached to the enclosure at the air outlet for driving air from inside the enclosure to an exterior of the enclosure.

17. The computer of claim 10, wherein the air inlet comprises a plurality of small holes, and the vibration element comprises a pair of hooks extending through two corresponding holes of the air inlet, respectively, whereby the vibration element is fixed on the enclosure.

18. The computer of claim 17, wherein each hook of the vibration element is L-shaped.

* * * * *